US012641074B2

(12) United States Patent
Winship et al.

(10) Patent No.: US 12,641,074 B2
(45) Date of Patent: May 26, 2026

(54) COMPUTER SYSTEM ARCHITECTURE WITH MODULAR APPROACH

(71) Applicant: The Government of the United States of America, as represented by the Secretary of Homeland Security, Washington, DC (US)

(72) Inventors: Courtney Winship, Dunkirk, MD (US); Michael Weissman, New York, NY (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 21 days.

(21) Appl. No.: 18/769,880

(22) Filed: Jul. 11, 2024

(65) Prior Publication Data

US 2025/0023865 A1 Jan. 16, 2025

Related U.S. Application Data

(60) Provisional application No. 63/526,629, filed on Jul. 13, 2023.

(51) Int. Cl.
*H04L 9/40* (2022.01)

(52) U.S. Cl.
CPC .......... *H04L 63/083* (2013.01); *H04L 63/102* (2013.01); *H04L 63/20* (2013.01)

(58) Field of Classification Search
CPC ...... H04L 63/083; H04L 63/102; H04L 63/20
See application file for complete search history.

(56) References Cited

U.S. PATENT DOCUMENTS

2016/0105443 A1* 4/2016 Yu .......................... H04L 63/102
726/7
2020/0356694 A1* 11/2020 Lee ........................ H04L 9/3263
2023/0214925 A1* 7/2023 Cella ...................... G06Q 30/06
705/37

* cited by examiner

*Primary Examiner* — Khoi V Le
(74) *Attorney, Agent, or Firm* — Kelly G. Hyndman; Robert W. Busby

(57) ABSTRACT

Embodiments include a method to provide access to services, including receiving, by an information sharing platform, a user at a landing page of the information sharing platform for selectively accessing services through the information sharing platform. The information sharing platform can use an application programming interface (API) to access an Identity, Credential, and Access Management (ICAM) component to authenticate the user based on user credentials of the user. The information sharing platform stores and retrieves profile attributes for the user, which is uses to customize the information sharing platform content presented to the user. The information sharing platform retrieves, from the ICAM component, Attribute-Based Access Control (ABAC) credentials corresponding to the ICAM component authenticating the user, and selectively enables or prevents access (based on the ABAC credentials) to components that provide component services, or content which the information sharing platform fetches and retrieves from components.

20 Claims, 9 Drawing Sheets

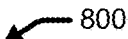
800

Receiving, by an information sharing platform, a user at a landing page of the information sharing platform for selectively accessing services through the information sharing platform 810

↓

Accessing, by the information sharing platform using an application programming interface (API), an Identity, Credential, and Access Management (ICAM) component, to authenticate the user based on user credentials of the user 820

↓

Retrieving, from the information sharing platform responsive to authenticating the user, profile attributes stored at the information sharing platform for the user 830

↓

Customizing information sharing platform content presented to the user, based on the profile attributes of the user 840

↓

Retrieving, from the ICAM component, Attribute-Based Access Control (ABAC) credentials corresponding to the ICAM component authenticating the user 850

↓

Enabling the user to access, through the information sharing platform, a first component that provides component services, based on the information sharing platform checking that the ABAC credentials of the user are compatible with the user having access to the first component 860

↓

Preventing the user from accessing a first other component available through the information sharing platform, based on the information sharing platform checking that the ABAC credentials of the user are not compatible with the user having access to the first other component 870

↓

Presenting, at the information sharing platform for user interaction, content which the information sharing platform fetches and retrieves from a second component via another API, based on the information sharing platform checking that the ABAC credentials of the user are compatible with the user having access to the content from the second component 880

↓

Preventing the information sharing platform from displaying content from a second other component, based on the information sharing platform checking that the ABAC credentials of the user are not compatible with the user having access to the content from the second other component 890

↓

Security trimming the component services from the first component, and the content from the second component, based on the ABAC credentials of the user 895

*FIG. 8*

COMPUTER SYSTEM ARCHITECTURE WITH MODULAR APPROACH

CROSS-REFERENCE TO RELATED APPLICATIONS

This application is a nonprovisional application that claims the benefit of priority from U.S. provisional application 63/526,629 filed on Jul. 13, 2023, entitled "Computer System Architecture with Modular Approach," the disclosure of which is incorporated by reference in its entirety.

STATEMENT OF GOVERNMENT INTEREST

The present invention was made by employees of the United States Department of Homeland Security in the performance of their official duties. The Government has certain rights in the invention.

FIELD

The discussion below relates generally to computing systems to provide access to services.

BACKGROUND

Existing computer portals can be expensive to maintain and difficult to upgrade because they can be one monolithic application that has to do everything, with difficult registration, information being siloed within communities, and no easy way for users to find each other. The computer portal user interface is not always consistent and can be confusing. For example, content can be available only to group members, there can be a two-step authorization process for users, it can be difficult to get temporary users on board, and there can be administrative burdens for community leaders.

SUMMARY

In an embodiment, a method to provide access to services includes receiving, by an information sharing platform, a user at a landing page of the information sharing platform for selectively accessing services through the information sharing platform. The information sharing platform accesses, using an application programming interface (API), an Identity, Credential, and Access Management (ICAM) component, to authenticate the user based on user credentials of the user. The method retrieves, from the information sharing platform responsive to authenticating the user, profile attributes stored at the information sharing platform for the user. The method customizes information sharing platform content presented to the user, based on the profile attributes of the user. The method retrieves, from the ICAM component, Attribute-Based Access Control (ABAC) credentials corresponding to the ICAM component authenticating the user. The method enables the user to access, through the information sharing platform, a first component that provides component services, based on the information sharing platform checking that the ABAC credentials of the user are compatible with the user having access to the first component. The method prevents the user from accessing a first other component available through the information sharing platform, based on the information sharing platform checking that the ABAC credentials of the user are not compatible with the user having access to the first other component. The method presents, at the information sharing platform for user interaction, content which the information sharing platform fetches and retrieves from a second component via another API, based on the information sharing platform checking that the ABAC credentials of the user are compatible with the user having access to the content from the second component. The method prevents the information sharing platform from displaying content from a second other component, based on the information sharing platform checking that the ABAC credentials of the user are not compatible with the user having access to the content from the second other component. The method security trims the component services from the first component, and the content from the second component, based on the ABAC credentials of the user.

In another embodiment, a system to provide access to services includes a computer system, which includes a processing system having a hardware processor configured to perform a predefined set of basic operations by loading corresponding ones of a predefined native instruction set of codes. The predefined native instruction set of codes constitutes a set of instructions selectable for execution by the hardware processor. The computer system includes a memory accessible to the processing system and a user interface controller under control of the processing system. User interface logic, stored in the memory, includes a sequence of instructions selected from the predefined native instruction set of codes of the hardware processor, adapted to: operate with the processing system and the user interface controller to implement a user interface adapted to prompt for user input and receive the user input; receive a user at a landing page of an information sharing platform for selectively accessing services through the information sharing platform. A communication system, under control of the processing system, is adapted to communicate with components that provide component services. Application programming interface (API) logic, stored in the memory, includes a respective sequence of instructions selected from the predefined native instruction set of codes of the hardware processor, adapted to use an API to access an Identity, Credential, and Access Management (ICAM) component, to authenticate the user based on user credentials of the user. Attribute-Based Access Control (ABAC) logic, stored in the memory, including a respective sequence of instructions selected from the predefined native instruction set of codes of the hardware processor, is adapted to: retrieve, from the ICAM component, Attribute-Based Access Control (ABAC) credentials corresponding to the ICAM component authenticating the user; enable the user to access, through the information sharing platform, a first component that provides component services, based on the information sharing platform checking that the ABAC credentials of the user are compatible with the user having access to the first component; prevent the user from accessing a first other component available through the information sharing platform, based on the information sharing platform checking that the ABAC credentials of the user are not compatible with the user having access to the first other component; present, at the information sharing platform for user interaction, content which the information sharing platform fetches and retrieves from a second component via another API, based on the information sharing platform checking that the ABAC credentials of the user are compatible with the user having access to the content from the second component; and prevent the information sharing platform from displaying content from a second other component, based on the information sharing platform checking that the ABAC credentials of the user are not compatible with the user having access to the content from the second other component; The computer system also includes security trimming logic, stored in the memory, including a respective sequence of instructions selected from the predefined native instruction set of codes of the hardware processor, adapted to perform security trimming on the component services from the first component, and the content from the second component, based on the ABAC credentials of the user.

In yet another embodiment, a tangible non-transitory computer-readable medium having stored thereon computer-executable instructions that, if executed by a computing device, cause the computing device to receive, by an information sharing platform, a user at a landing page of the information sharing platform for selectively accessing component services through the information sharing platform; access, by the information sharing platform using an application programming interface (API), an Identity, Credential, and Access Management (ICAM) component, to authenticate the user based on user credentials of the user; retrieve, from the information sharing platform responsive to authenticating the user, profile attributes stored at the information sharing platform for the user; customize information sharing platform content presented to the user, based on the profile attributes of the user; retrieve, from the ICAM component, Attribute-Based Access Control (ABAC) credentials corresponding to the ICAM component authenticating the user; enable the user to access, through the information sharing platform, a first component that provides component services, based on the information sharing platform checking that the ABAC credentials of the user are compatible with the user having access to the first component; prevent the user from accessing a first other component available through the information sharing platform, based on the information sharing platform checking that the ABAC credentials of the user are not compatible with the user having access to the first other component; present, at the information sharing platform for user interaction, component content which the information sharing platform fetches and retrieves from a second component via another API, based on the information sharing platform checking that the ABAC credentials of the user are compatible with the user having access to the component content from the second component; prevent the information sharing platform from displaying content from a second other component, based on the information sharing platform checking that the ABAC credentials of the user are not compatible with the user having access to the content from the second other component; and security trim the component services from the first component, and the content from the second component, based on the ABAC credentials of the user.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

FIG. 8 illustrates a flowchart to provide access to services according to an embodiment.

DETAILED DESCRIPTION

Figure 1:
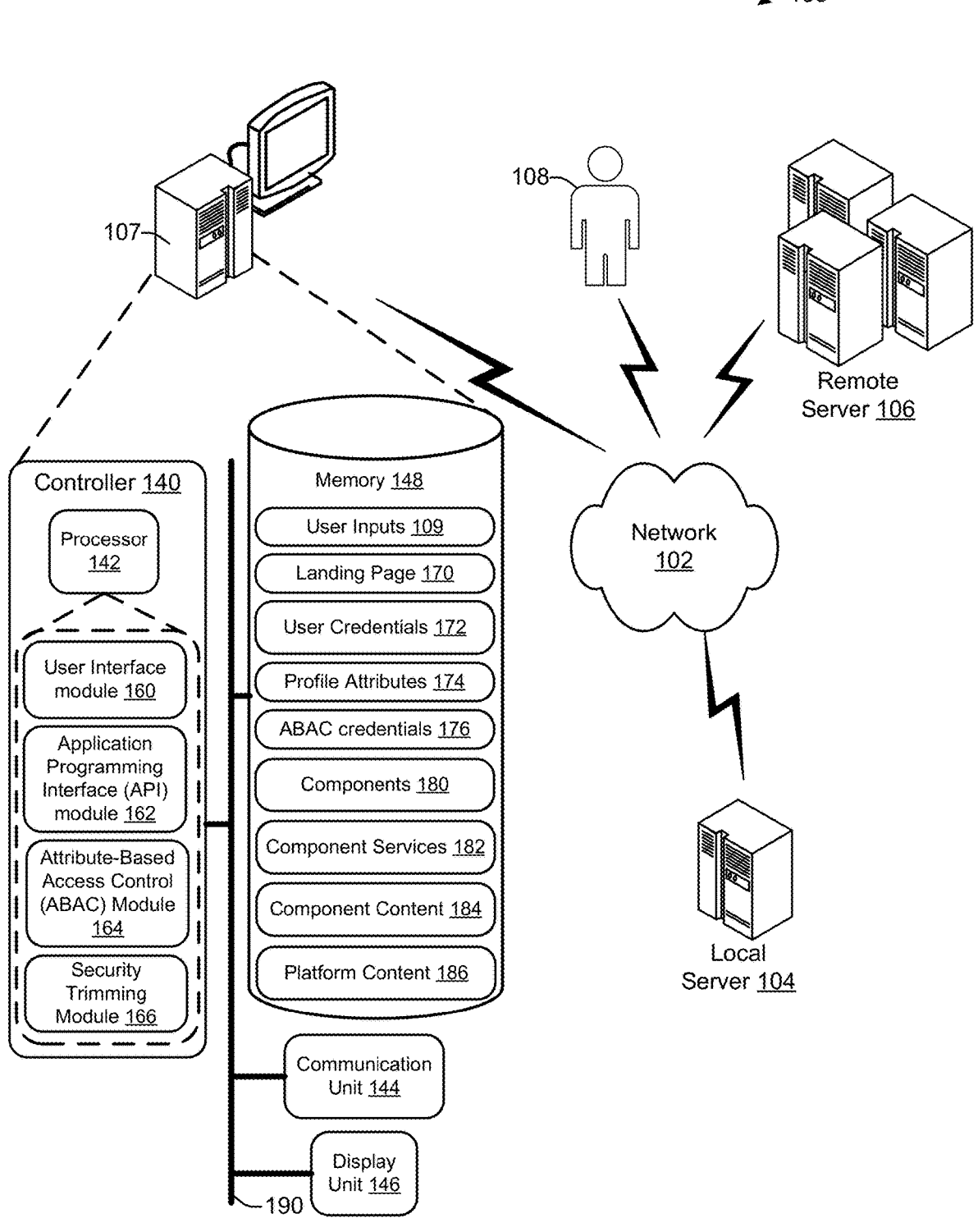
FIG. 1 illustrates a system to provide access to services according to an embodiment.

Embodiments described herein can serve as a platform (also referred to as a portal) that integrates best-in-breed components of various domains/engineering that communicate with each other through interfaces using cloud native technologies, providing a modular, dynamic, nimble platform. The platform is accessed through an intuitive user interface and available through web-based desktop and mobile applications. The computer system architecture can serve as a portal that manages registration, access control, and personalization. The portal can serve as a Home Page or Landing Page and controller for a user's interactions with exemplary computer system capabilities. The Portal supports a seamless experience by integrating computer system capabilities accessible via application programming interfaces (APIs) under a common user interface (UI), managing and centralizing access to content by coordinating with exemplary computer systems and services such as Content Management, Conferencing, Discussion Forums, enterprise services, application services (admin, security, alerts, notifications, workflow, automation, etc.), shared services (search, recommendations, reporting), and third-party resources (learning management, common operation picture (COP), analytical tools, geospatial capabilities, external data search, live feeds). Embodiments provide a modernized and trusted information sharing platform consisting of a suite of intuitive tools and services.

In an embodiment, the portal platform allows federal, state, local, territorial, and tribal (FSLTT) authorities, private sector entities, and some international organizations to share information with each other to support missions in public safety, emergency response, and law enforcement. The platform supports regular operations such as sharing intelligence and is also used to coordinate response for large events-both planned (such as a large sporting event) and unexpected (such as a natural disaster). The portal platform can be based on a distributed architecture, where the functionality is provided by applications that connect to each other and to the data layer through interfaces. Embodiments can be mobile responsive and designed from a mobile-first perspective (as determined by user need). Embodiments can interact with a mobile application or applications that may be targeted towards select groups of users to give those users access to the data and functionality they need to perform their duties. Embodiments of the platform can be cloud first, using cloud-native technology. Cloud-first, cloud-native technology enables the platform to more easily scale, maintain high levels of system performance, and rapidly respond to changing business requirements.

By using the portal platform, users can search across portal components for content, groups, people, and apps that meet their needs. Authorization is more automated, with reduced need for community leader intervention. Users can share information within the portal, instead of resorting to insecure email for sharing. Community leaders have full control over who and what they allow within their groups.

Functionality is available across mobile and desktop platforms, and independent of the method of authentication (e.g., Active Directory Federation Services (ADFS), login-.gov, and the like). Embodiments enjoy simple and secure information sharing, with select security levels that can be based on content sensitivity, commonality, or other criteria. APIs between components can accommodate security (authorization) and vendor licensing schemes (permission). The user experience is consistent across services and platforms, and synchronized between mobile and desktop devices. Embodiments can include a mobile app, that integrates with existing vendor mobile apps (e.g., SharePoint), and provides access to mobile-only features such as camera, location, security (FaceID), etc. while supporting multiple mobile device formats (e.g., sizes) and operating systems (iOS, Android). Unused features or solution components can be hidden or disabled. An embodiment can minimize or prevent portal data from being stored on the mobile device. Intra-portal app coordination can be performed with industry-standard APIs. Individual users can personalize their portal experience.

The platform can use entitlements, such as through the use of Attribute-Based Access Control (ABAC), to allow different users to be entitled to access different components or services of the platform. For example, the entitlement can enable a user to start a Zoom meeting through the platform, because that user's entitlements enabled the user to be pre-entitled to do that. However, the platform may prevent the user from accessing a certain forum, because the user's entitlements do not allow the user to access certain forums of the platform forum component. For example, a user my login and find they have access to a search service component, but not have access to some forums, based on the user's credentials as interpreted by the platform. In an embodiment, the platform enables the entitlements via, e.g., a combination of authentication/login identity-proving techniques (see ICAM description herein), combined with the approved access the user provides based on personal attributes/characteristics collected about the specific user (e.g., name, title, job function, etc.). The platform allows for accepting some of the information even if self-declared by the user (e.g., trusting the user), and the platform allows for accepting some of the information only after validating the information with an authoritative source (e.g., identity verification providers and the like).

FIG. 1 illustrates a system 100 to provide access to services according to an embodiment. The system 100 includes a computer system 107, in communication via network 102 with different types of users 108, local servers 104, and remote servers 106. The computer system 107 includes controller 140 coupled via a bus 190 to memory 148, communication unit 144, and display unit 146. The controller 140 includes a processor 142 to execute user interface module 160, API module 162, ABAC module 164, and security trimming module 166.

The memory 148 is associated with user inputs 109, landing page 170, user credentials 172, profile attributes 174, ABAC credentials 176, components 180, component services 182, component content 184, and platform content 186.

The computer system 107 includes one or more communicatively coupled communication units 144, processors 142, and memory 148. The communication unit 144 is representative of one or more devices able to communicate information to or from other devices and components including in instances those included in or external to the system 100. Example communication units 144 include but are not limited to wireless modems (such as an 802.11 compliant unit), wired (e.g., Ethernet-ready) or other such communication interfaces, or a cellular communication transceiver. Example 802.11 compliant modems or cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York.

Although a single processor 142 and memory 148 are shown, the computer system 107 can be constructed with multiple processors and memory. The processor 142 is representative of hardware that is capable of processing computer executable instructions, such as a central processing unit that executes a program of instructions. In embodiments, the processing unit (processor 142) implements an operating system which is a set of instructions that allows the processor to perform specialized instructions according to a program run on the operating system or processor platform.

Local memory 148 is representative of a wide variety and types and combinations of memory suitable for storing information in an electronic format. Example memory includes but is not limited to random access memory (RAM), hard disk memory, removable medium memory, flash storage memory, and other types of computer-readable media including non-transitory data storage.

In embodiments, the controller 140 is representative of hardware or software that is constructed to function as described in this disclosure. For example, the controller 140 is a combination of software (such as a program of instructions that is stored in local memory) that is useable by the processor 142 to provide the described capabilities and functions, such as when the embodied instructions are executed by the processor 142 included in the computer system 107. As illustrated and for ease of understanding, the controller 140 includes the processor 142 and the various illustrated generators and modelers, and other logic or features described herein. While shown and described as individual modules, the supporting hardware or software can be configured as an integrated program of instructions to provide the described functionality, such as through the use of application program interfaces (APIs) that permit individual programs to interface to one or more other programs and provide one or more graphical user interfaces (GUIs) output on a display unit 146 to a user to access information or exercise control over the computer system 107 including a visual display output.

The computer system 107 executes the various modules associated with processor 142. The user interface module 160 generates a user interface comprising the landing page 170 and receives user inputs 109. This enables the platform to use the API module 162 to interface with multiple different components via APIs, such as cloud service provider APIs, content storage and management system APIs, collaboration suite APIs, approved third-party applications, and the like. The API module 162 can utilize a microservice architectural pattern, automated test suite, and a CI/CD pipeline for a Cloud Native deployment. Activities can leverage enterprise shared services and Commercial/Government Off the Shelf (COTS/GOTS) solutions. The ABAC module 164 interfaces with, e.g., an ICAM component to determine credentials for the user, based on the user inputs 109 to authenticate the user. The security trimming module

166 enables the platform to selectively control which components 180, component services 182, component content 184, or platform content 186 that the platform will allow the user to access, and to what extent.

The computer system 107 can make use of services on scalable infrastructure, where resources can be provisioned and scaled in real-time to meet traffic and user demand spikes. The computer system 107 can provision resources on demand, the resources scale based on real-time user demand, resources can be provisioned through APIs, resources are available in multiple regions, and static assets can be served through a content delivery network.

Figure 2:
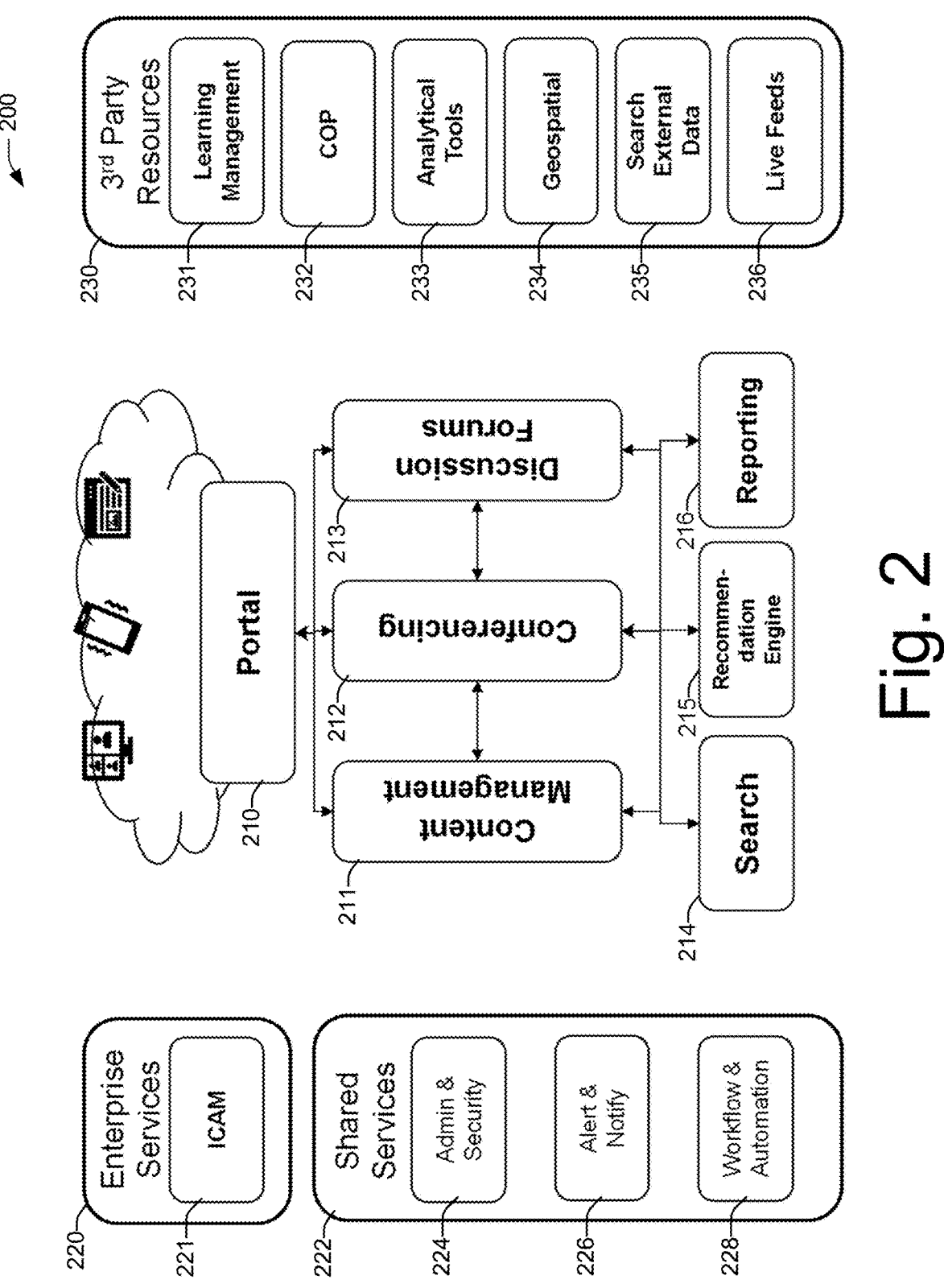
FIG. 2 illustrates a system architecture to provide access to services according to an embodiment.

FIG. 2 illustrates a system architecture 200 to provide access to services according to an embodiment. The system architecture 200 serves as a platform for information sharing.

The Portal component 210 can generate a landing page to receive a user. Together with the Identity, Credential, and Access Management (ICAM) component 221, the Portal component 210 of the platform system architecture 200 manages registration, access control and personalization. The portal can serve as a "single pane of glass" that serves as a Home Page or Landing Page and controller for a user's interactions with platform capabilities. For those capabilities that support headless integration, the Portal 210 may also manage separate interfaces for mobile (both Android and iOS) and desktop (Windows/Mac) access, although platform capabilities can be accessible from both interfaces. The Portal 210 supports a seamless experience by integrating those capabilities accessible via APIs (i.e., "headless") under a common UI and managing and centralizing the ABAC access to content by coordinating with the portal components (e.g., ICAM component 221). Attribute-Based Access Control (ABAC), sometimes referred to as Policy-Based Access Control (PBAC) or Claims-Based Access Control (CBAC), is an identity management-related authentication and authorization system that determines user access based on attributes (or characteristics) rather than roles. The Portal component 210 includes various technical capabilities, including supporting multichannel (e.g. computer, phone, tablet, etc.), personalization, dashboards, and providing enterprise portal functionality. The portal 210 can interact with data objects such as account, person (user) profile (can include name, organization, mission area, contact information, location, about you, credential(s), preferences, skills, and the like), dashboards. The data objects can be linked to content, communities/groups, subscriptions/feeds, notifications, skills, and training completed. Such functionality can be provided for the platform 200 by representative products such as General Purpose Portals-WebSphere Portal, SharePoint Portal, Service Now, Oracle Weblogic Portal, and Specialized Portals (Common Operating Picture)—Nice, WebEOC, Veoci, and other enterprise portal vendors. Embodiments can serve as an enterprise portal, also known as an enterprise information portal (EIP), to provide a secure unified access point.

The Content Management component 211 provides traditional document and binary large object (BLOB) management capabilities including versioning, locking, check-in/out, user-definable & searchable metadata, ABAC security trimming, notifications and the advanced features of OCR capture, intelligent extraction and automated tagging, deconstruction, redaction, notifications, and record management. Document creation/simultaneous editing and workflow can also be executed in other components. Content Management 211 supports traditional documents and multimedia and BLOB formats. Content Management 211 supports a seamless experience by allowing any type of content to be displayed on any user device (Desktop—Windows/Mac; Mobile—Android/iOS). Content Management 211 includes videos, and supports a wide variety of documents and Blobs, video, audio. Content management 211 supports user-definable, searchable metadata, supports versioning of documents, and supports other advanced features such as co-authoring, capture OCR, intelligent extraction and tagging, collaboration, deconstruction, redaction, security trimming, notifications, workflow, record management, etc. Personalized content is supported, including activities related to customizing and viewing portal personalized information delivered to the portal user. The platform can use personalized content in various use cases, allowing users to customize how they interact with platform content, groups, users, etc., and include functionality such as providing recommendations for groups that a user may want to join based on their interests. Platform content also includes activities related to document management and collaboration, searching content, receiving alerts, and recommendations for subscribing to new content. The portal platform allows users to upload, share, search, and review documents. Capabilities include collaboration such as live co-authoring. Content, services, features, and the like can be stored at data layer 337 shown in FIG. 3, such as groups 338. Embodiments can be organized around communities of interest (COIs), a shared space focused on a common purpose or objective. COIs contain content libraries and other resources for their members. The personalized content can make group content and membership available for discovery by portal users who have the appropriate authority to review or request it. The content management component 211 supports a wide variety of docs and blobs, video, audio. Supports user-definable, searchable metadata. It supports versioning of documents, and advanced features such as co-authoring, capture OCR, intelligent extraction and tagging, collaboration, deconstruction, redaction, security trimming, notifications, workflow, record management, etc. Embodiments can enable various features, such as Enterprise File Sync and Share (EFSS) including SharePoint, MS OneDrive, Google Drive, Box, Dropbox Business. Embodiments support Document Management Systems such as OpenText, Nuxio/Alfresco, Office365. Embodiments support creation/editing Tools such as O365, GSuite/Workspace.

The Conferencing component 212 utilizes information/attributes from ICAM and portal profiles (e.g., as stored at portal component 210) to provide real-time collaboration between authorized platform users. Conferencing capabilities include scheduling and executing web meetings/conferencing, direct VOIP calling, direct messaging, persistent virtual meeting spaces, and file sharing and whiteboarding during meetings. The conferencing component 212 allows users to integrate meetings and events with their local calendar. Conferencing 212 supports a seamless experience by allowing real-time interaction among users across any type of device. Conferencing 212 supports real-time interactions via chat/direct messaging, web meetings/conferencing, VOIP calling, unified communications, screen sharing, file sharing, whiteboarding, real-time interactions, chat/direct messaging, events and calendars. An example service from conferencing 212 is the ability to join a meeting. For example, an emergency management professional receives an email invitation from a regional coordinator about a planning meeting taking place. The email has a link to get into the meeting. Clicking the link, the individual is directed to the registration page where they provide basic information about themselves. Once logged in and approved by security trimming, the user has direct access to the meeting. The conferencing component 212 can provide activities related to creating groups, managing the groups, and group content. The conferencing component 212 also supports data objects including directories, events, calendars, recordings, and chat logs, linked to communities/groups, notifications/ announcements, and content. This functionality can be provided by representative products such as Adobe Connect, MS Teams, Microsoft 365 Enterprise, Google C&C Solutions, Cisco UCM, Zoom Platform, and Meta. The conferencing component 212 supports real-time interactions via web meetings/conferencing, VOIP calling, unified communications, screen sharing, whiteboarding, chat/direct messaging, events and calendars. Embodiments can enable such features using Adobe Connect, MS Teams, Microsoft 365 Enterprise, Google C&C Solutions, Cisco UCM, Zoom Platform, Meta Workplace.

The Discussion Forums component 213 provides asynchronous collaboration among platform users by supporting persistent discussion forums with message threads (including documents) and user posts. Forums may be open or closed, managed or ad hoc message boards. Discussion forums component 213 supports a seamless experience by allowing equal access to persistent discussions independent of the method of authorization or the accessing device. Discussion forums component 213 supports formal, standing message boards, the ability to quickly stand-up ad-hoc message boards, closed or open boards, and supports an individual's "wall," which reflects a message board that he administers that may or may not allow outside posting. Discussion forums component 213 also provides collaboration tools and communications to manage discussion boards. The discussion forum component 213 supports formal, standing message boards, ability to quickly stand-up ad-hoc message boards, closed or open boards, and supports individual's "wall" that reflects a message board that he administers that may or may not allow outside posting. Embodiments can enable such features using Slack, Workplace from Meta, Teams, Open Source Macro-blogging such as Minds, Diaspora, Elgg, Friendica, HumHub, Hubsville, Tooter, Lemmy, and Open Source Micro-blogging such as Mastadon, Pleroma, gnuSocial, Peach, Ello.

Figure 3:
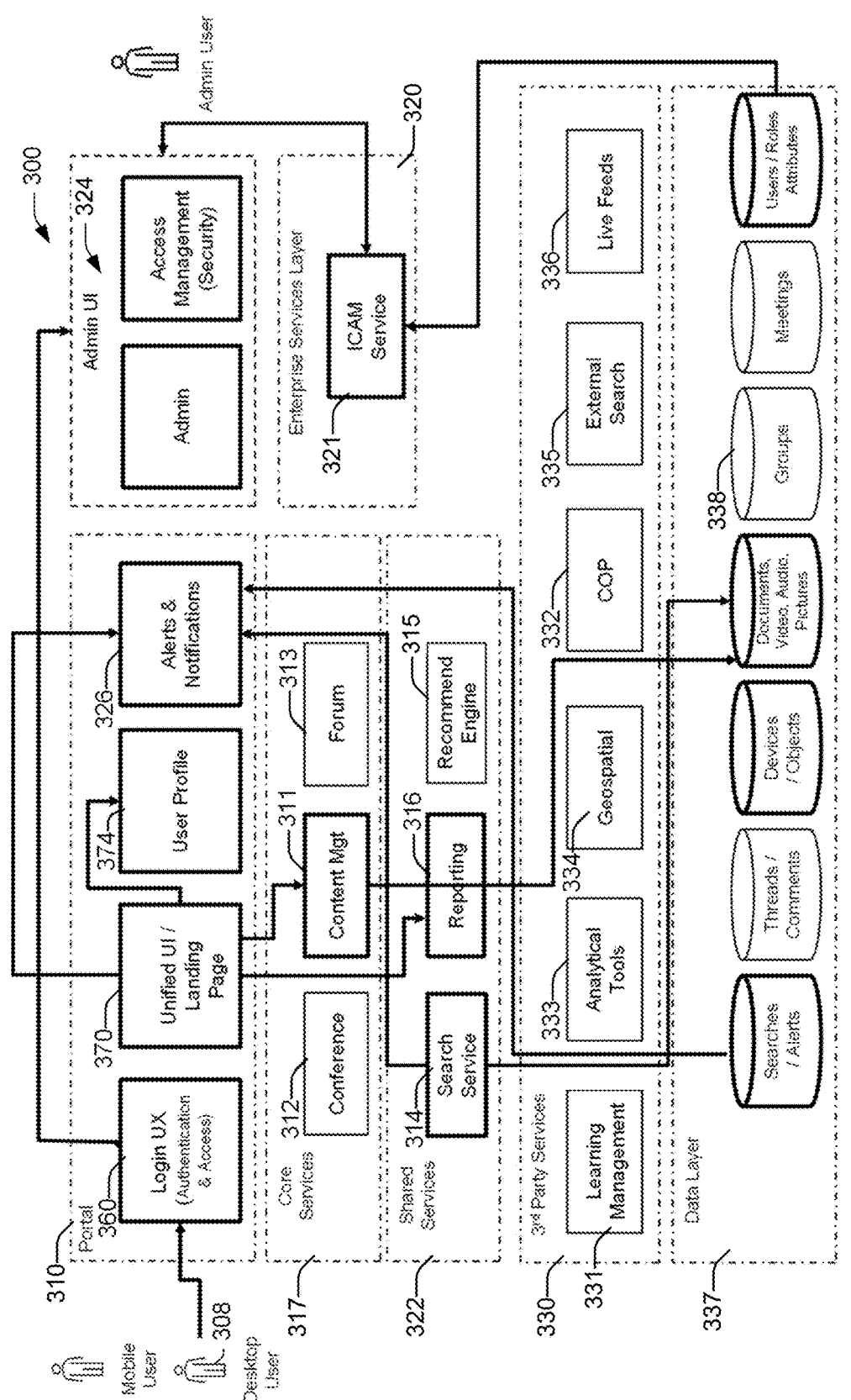
FIG. 3 illustrates a system architecture to provide access to services according to an embodiment.

The search component 214, recommendation engine 215, and reporting component 216 can be referred to as shared services, (e.g., as depicted visually in FIG. 3). A shared service is a category of component that spans the platform core services. A shared service can be platform-specific and spans core services.

The search component 214, in an embodiment, can be a shared service that provides flexible and smart searching of all platform data stores. The platform search engine 214 supports full-text searching, fuzzy searches, browser-based search syntaxes, and enrichment features such as spellchecking, geotagging, and semantic models. The platform security trims and display results in categories (e.g., documents, messages, conference notes, user profiles, 3rd party data, LMS catalog etc.) so that they may also be filtered. The platform search 214 can be built in Azure Cognitive Search. The search component 214 can be used for information, such as the following scenario in which a user logs in on Monday morning to catch up on events from the weekend and read about any new intel. While browsing a community that they are a member of on the portal platform, they notice that another person in the group reported a recent drug seizure. They save the report and additional materials that they find while exploring the portal. They develop a report offline for their department and other partners by analyzing this new local threat and share it via email with local interest departments and a group of medical professionals that are interested in new trends. The search component 214 also includes a feature to "find a person," which operates according to the following scenario: a portal user wants to find other portal users who also work on cryptocurrency crimes. She searches for people that she knows are on the portal that are known in the crypto world. She can view their profiles which has their contact information and their topics of interest. She takes a moment to check their profile settings to get their contact information.

The recommendation engine component 215 is a shared service that provides platform users suggestions for groups, people, documents, discussion threads, and meetings that match their interests. The recommendation engine 215 makes recommendations to users regarding additional content to read or that might otherwise be relevant to the user.

The reporting component 216 is a shared service that allows authorized platform users (e.g., as authorized by the platform based on their attributes and any applied security trimming as needed) to run saved or ad hoc reports across the full spectrum of data stored in individual platform components. The reporting component 216 can run a report such as "Which Group X users (ICAM) have posted the most messages (Discussion Forums)."

Enterprise Services component 220 includes ICAM component 221. The ICAM component 221 is an enterprise service that authenticates a user's access to the platform via, e.g., OAuth, Login.gov, or the like. The ICAM component 221 stores, e.g., users' self-declared and authoritative attributes. After initial authorization, the Portal 210, acting as a controller, retrieves and presents a user's ABAC credentials from ICAM 221 and presents these credentials to each platform component as they are called. ICAM 221 supports a seamless experience by ensuring that access is centrally managed across all functional components, consistent between authentication (e.g., OAuth and Login.gov authentication), and consistent between desktop and mobile access. ICAM 221 can be categorized as an enterprise service because it can be provided as a single sign-on (SSO) utility. However, ICAM 221 also can serve as a primary repository for platform ABAC attributes. The use of enterprise services ensures a seamless experience by ensuring that platform users are served in accordance with accepted standards. ICAM 221 can support activities related to user account creation, authentication, authorization, and managing portal user profile. ICAM 221 enables the platform system 200 to authenticate users and grant users' access to content, services, etc. Users can have access to subsets of content based on their roles, as defined by user attributes/profiles and security trimming. The platform system 200 authorizes access to content in one or more communities of interest (COIs) based on their role. ICAM 221 can integrate with other enterprise solutions for authentication and authorization.

The shared services component 222 include Admin & Security logging 224, Alert & Notify 226, and Workflow & Automation 228.

The administration and security ("Admin & Security") component 224 provides a centralized console to manage these services across platform core services. Admin & Security capabilities include superuser capabilities across components (e.g., "Delete user and user posts from the system"), centralized log aggregation, and platform-specific security features (e.g., data loss prevention). Administration and Security supports activities related to portal system administration, including user access, notifications, roles, groups, metrics, reporting, and audit. Administration services provided by Admin & Security 224 supports use cases for revoking accounts, capturing audit trails, and providing reporting about system use, and can leverage enterprise service solutions and administrative functionality related to group management and other capabilities.

The alert and notify component 226 can take several forms. The alert and notify component 226 allows platform users to be reactively alerted and notified to various events, such as whether a document changes, a message is posted, an event is organized, or a workflow action is required. In addition, users may proactively be notified in case of broadcast messages or emergency events. Because alerts and notifications cut across core platform services, the alert and notify component 226 can be a shared service application service, or an enterprise service (platform-wide) or a platform shared service.

The workflow and automation component 228 supports actions that cross core components. These actions can include (a) the initialization of a user in predetermined discussion forums based upon his ICAM registration; (2) the routing and signoff of document approvals for publishing or posting; or the (3) the collection of outside information (e.g., news) for posting on the portal platform. Like logging and notifications above, the workflow and automation component 228 can be implemented as an enterprise service or as a platform shared service. The workflow and automation component 228 enables collaborating on a document, as described in the following scenario. A portal user wants to work on a document with her colleague that works in another state. They are both portal users. User A works up a draft document on her local computer. When finished, she uploads the document to the portal. User A gets the link to the document and emails it to User B instructing him to click on the link and provide edits/comments. User B receives the email, clicks on the link, and opens up the document for component that is loosely integrated. The LMS manages the skills, courseware, curriculum, and training completed databases for each platform (user) profile. LMS also integrates with ICAM to ensure that a user has up-to-date credentials.

The Common Operation Picture (COP) component 232 is a drop-in component that provides real-time situational awareness of critical events. The COP 232 can deliver similar functionality as the core services, but the COP 232 can fuse real-time data feeds of news, live video, and the geo-tracking of critical resources into a single operational picture.

The Analytic Tools component 233 is a collection of internal and external utilities that may be used by platform users. Utilities can include a national 411 directory, a geocoding utility, a data base of technical experts (e.g., HazMat, CDC, etc.), reverse phone number lookup, inter alia.

The geospatial component 234 provides basic map capabilities such as viewing road, topographical, and satellite viewpoints; routing, points of interest; and KML file import/ export. Additional platform capabilities include editing and map markup and the flexible sharing of marked up maps among platform groups or users.

The search external data component 235 includes safe internet searches as well as searches of other Federal and State databases accessible via the portal platform that are not Internet-accessible.

The live feeds component 236 includes the functionality of incorporating live video feeds into a platform Group or Conference. Such live video feeds can support all user devices and can include automated transcription and smart tagging including geotagging.

Embodiments of the portal platform can make use of the following technologies to implement various functionality described above:

| Function | Application |
|---|---|
| Account Management | Microsoft Identity Manager (MIM), AuthPortal, Login.gov |
| Federation | Microsoft Active Directory Federation Services (ADFS) |
| Soft Token | OKTA Two Factor Authentication (TFA) |
| Authorization | Role Based Access Control (RBAC), ALMS |
| Identity Proofing | Equifax-Anakam Identity Proofing, OKTA |
| Enterprise Cloud | AWS, Azure |
| Credential Store(s) | Microsoft Identity Management (MIM), Active Directory (AD) |
| Desktop Sharing/eLearning | Adobe Connect |
| Portals | SharePoint 2016, Bamboo, Lightning Conductor |
| Help Desk Ticketing | ServiceNow |
| Data Services & Analytics | PowerBI, Tableau |
| Request for Information | Custom .Net applications | review and edits. When User B is finished, he notifies User A via email that he is finished. User A opens up the email and clicks on the link to review the edits and comments.

Third-party resources component 230 can be a loose set of tools in a platform utility toolbox. The platform learning management system component 231, a Common Operating Picture (COP) subsystem component 232, and analysis and display (analytical) tools component 233 are examples of drop-in components. Third-Party resources 230 can be standalone with little data integration with the other platform components, and do not need to comply with standard platform UI. Third-party resources component 228 allows integration with technology to support portal processes.

The learning management component 231, also referred to as Learning Management System (LMS), is a platform The portal platform 200 can support multichannel (e.g. computer, phone, tablet, etc.) and personalization, via a native mobile or responsive app. Embodiments can enable such features using custom HTML5 code, general purpose portal frameworks such as WebSphere Portal, SharePoint Portal, Service Now, Oracle Weblogic Portal, or the like. Specialized portal frameworks (Common Operating Picture) also can be used, such as Nice, WebEOC, and Veoci.

FIG. 3 illustrates a system architecture 300 to provide access to services according to an embodiment. The system architecture 300 includes portal 310, core services 317, shared services 322, third-party services 330, data layer 337, admin UI 324, and enterprise services layer 320. The portal 310 includes login UX (authentication and access) 360, unified UI/landing page 370, user profile 374, and alerts and notifications 326. The core services 317 includes conference 312, content management 311, and forum 313. The shared services 322 includes search service 314, reporting 316, and recommendation engine 315. The third-party services 330 includes learning management 331, analytical tools 333, geospatial 334, COP 332, external search 335, and live feeds 336. The data layer 337 includes searches/alerts, threads/comments, devices/objects, documents, video, audio, pictures, groups 338, meetings, and users/roles attributes. The admin UI 324 includes admin and access management (security). The enterprise services layer 320 includes ICAM service 321. Some components and services illustrated in FIG. 3 are similar to those components and services that are already described above with reference to FIG. 1 and FIG. 2.

System 300 illustrates an embodiment of how the platform application works, and how the components work together (e.g., according to the arrows indicating logical process flow through the system architecture 300). A user 308 (top left) interacts with the platform Portal 310, logging in and reaching the landing page 370. The landing page 370 includes links where the user can access the user directory (e.g., as indicated in their user profile 374) and their alerts and notifications (e.g., as indicated in the alerts and notifications 326). The landing page 370 also includes links to content/services such as documents, meetings, and discussions, that will direct the user to services such as, e.g., Content Management 311, Conferencing 312, and Forums sub-components 313, respectively. The landing page 370 also includes a Search bar that engages the Search service 314, a link to Reporting 316 of the platform, and recommendations generated by the Recommendations engine 315 service (which the platform can display on the landing page 370 along with other alerts and notifications). The landing page 370 also provides access to third party applications (third party services 330) and access to data (data layer 337) that are external to the platform but are presented for users' convenience, like the Learning Management System, Geospatial tools, and a directory of live feeds. The landing page 370 can provide the user access to data via data layer 337. Also, the various components and services can access the data layer 337 as needed for those components or services. For example, the user can access the search service 314, which then accesses documents, video, audio, pictures of the data layer 337 to perform the search, without the user needing to access the documents, video, audio, pictures data directly.

The platform portal 310 provides connections between the internal or external sub-components (e.g., platform core services, platform 3$^{rd}$-party services, and so on) via standard URLs or APIs, where a referring link and resulting action (launching an external application or retrieving data) are available to the user, if the user has the correct attributes to access that material. The platform determines whether the user has the correct attributes based on the admin UI 324, ICAM service 321, and by performing security trimming. Accordingly, the platform can allow the user to access some services/components/data, while preventing the user from accessing others. In an embodiment, the platform provides connections between the platform core services 317, platform 3$^{rd}$-party services, and the platform data layer 337 via API, so that the platform can ensure proper security trimming.

Components illustrated in FIG. 3 include an access control system (e.g., admin component and access management (security) component of admin UI 324, which includes a user interface for administrative access. Throughout FIG. 3, some components and connections are shown in bold lines, including those involved in user login (login UX 360), the ability to update the user's profile (user profile 374), access to a unified UI (Unified UI/Landing page 370) including access to content management 311, (upload, share, search 314), reporting 316 for auditing/metrics, and basic system administration (admin UI 324, ICAM service 321), and the like for providing important features. The components of the platform communicate with each other to deliver functionality of high-level use cases. Example arrows show the components that communicate with each other to fetch and retrieve content for display in the platform portal. Components include conference management 312 for conducting virtual meetings, the ability to search for groups 338, discussion forums 313, the ability to search within forums 313, and a recommendation engine 315 to surface content, groups, discussions, and meetings that may be of interest to a person based on their attributes. Also shown are applications (third-party services 330) and data (data layer 337) that can be of interest to platform users.

The ICAM service component 321 supports functionality such as send out invitations, prove identity, authenticate (e.g., via a Personal Identity Verification (PIV) card or authentication portal such as Login.gov), authorize role, group, documents, manage account info, request/verify credentials, attributes, update alerts and notifications, request role change, authorize application access, authenticate federated PIV, designate successor, set away status, and so on.

Various components support functionality for personalization, such as view alerts, view document updates, share my location, view notifications, view my network, connect to a person, customize homepage, view my recommendations, view group updates, and show away status.

The groups component 338 supports functionality such as group management, request group membership, search/request a group, invite new members, manage access requests, update group profile, remove/lock document, customize group page, select from template, remove/lock thread, add meeting to calendar. The groups component can also include communities. The groups component includes technical capabilities such as formal, standing message boards and quickly stood-up ad-hoc message boards, message boards may be closed or open, an individual's "wall" that reflects a message board that he administers that may or may not allow outside posting. Data objects include Communities/Groups, Message Boards, Messages, Board Roles/Privileges, Distribution Lists, which can be linked to Person Profile, Notifications, and Content. This functionality can be provided by representative products such as Slack, Workplace from Meta, Teams, Open Source Macro-blogging—Minds, Diaspora, Elgg, Friendica, HumHub, Hubsville, and Tooter, Open Source Micro-blogging—Mastadon, Pleroma, gnuSocial, Peach, and Ello.

The conference component 312 or forum component 313 support functionality such as Conduct Virtual Meeting, Create Discussion Thread, Post/Upvote Thread or Comment, Pin Thread/Document.

The content management component 311 supports functionality such as Upload Documents, Share Documents, Create Documents, Co-author Documents, Find Favorite Document, Geotag Documents, Comment on a Document.

The Alerts and Notifications component 326, or the search service component 314, support functionality such as searching the portal, creating an alert, searching a person by name, searching a person by expertise, updating an alert, creating a data watch alert.

The admin component in the admin UI 324 supports functionality such as Create/Update Roles and Accounts, Issue Notification, Audit System Usage, Metrics/Reporting, Provide User Support, New Group Request, Remove/Archive Group, Detect Unusual Activity, transfer user account.

The learning management component 331 supports data objects such as Skills Data Base, Courseware Data Base, Curriculum Paths, and Training Completed, linked to a person profile. Such functionality can be provided by representative products such as Workday.

The search component 314 supports capabilities such as numerous adapters for multiple sources, full text search by keyword with spellchecking, Boolean and advanced search and syntax features of the leading search engines (with fuzzy searching), enrichment through ontological and semantic models, and security trimming. Data objects include saved searches and enrichment models, linked to a person profile. Such functionality can be provided by representative products such as Azure Cognitive Search, Google Cloud Search, Elasticsearch, Solr, and Algolia.

In an embodiment, the search component 314 applies security trimming by considering the user's attributes, profile, and other user information to determine whether to suppress search results for that user. For example, if the user does not have security clearance to see search results for a given forum, the search component 314 will determine that such search results (e.g., tagged with a threshold clearance level requirement) are not consistent with the user's current security clearance, and not display such given forum in the search results for that user. The search service 314 can apply security trimming on granular levels, including security trimming data results for a given component, even if that user's credentials meet the threshold for viewing the search results for that component (but not the specific data results of that component). For example, a user's attributes/profile may meet the criteria for accessing the geospatial component 334, but not meet the criteria for data corresponding to specific locations.

Figure 4:
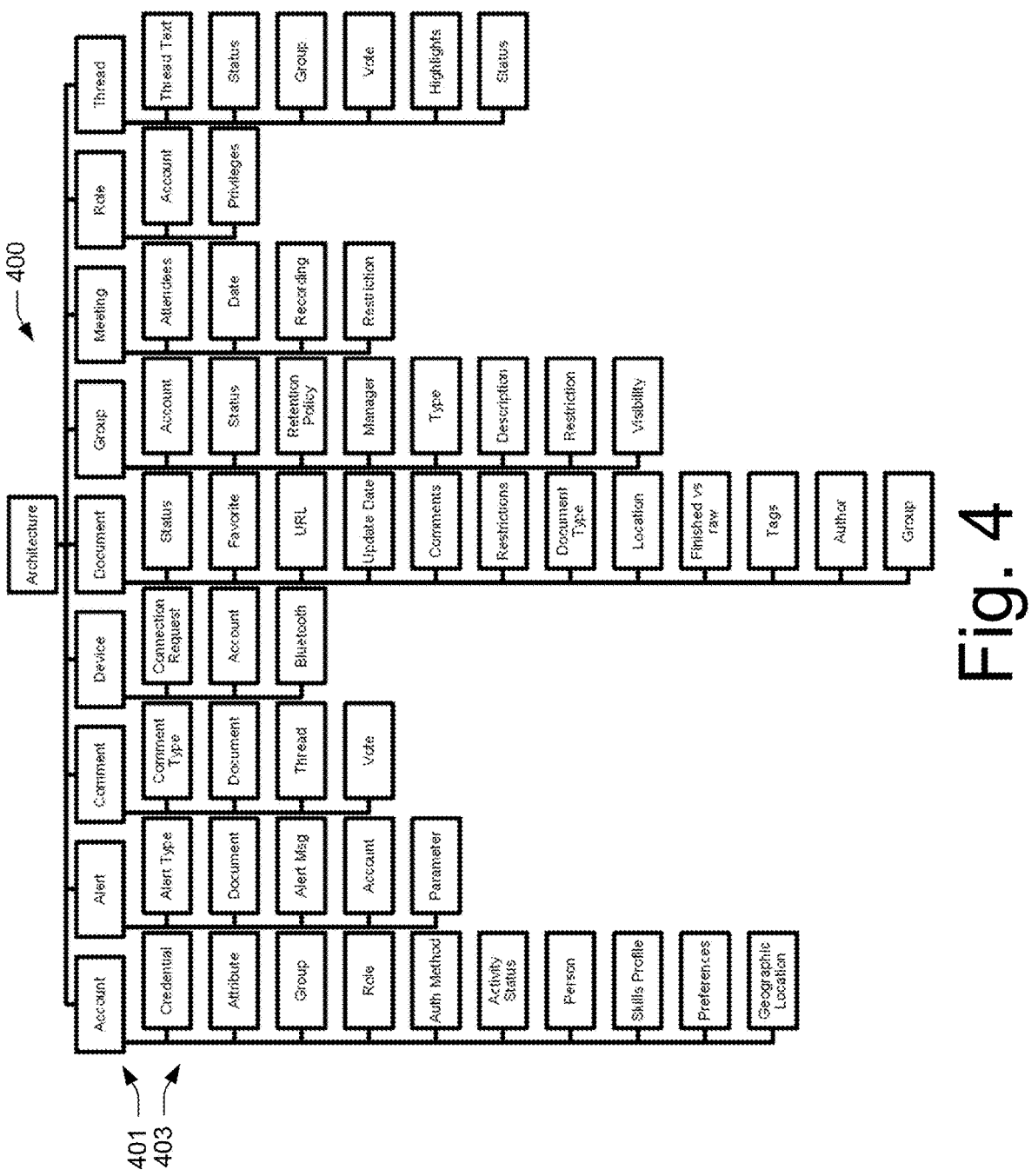
FIG. 4 illustrates a data architecture for use by a system to provide access to services according to an embodiment.

FIG. 4 illustrates a data architecture 400 for use by a system to provide access to services according to an embodiment. The data architecture 400 illustrates example categories 401, and corresponding services/components/data 403 arranged under those categories 401. Some components and services illustrated in FIG. 4 are similar to those components and services that are already described above with reference to FIGS. 1-3.

Figure 5:
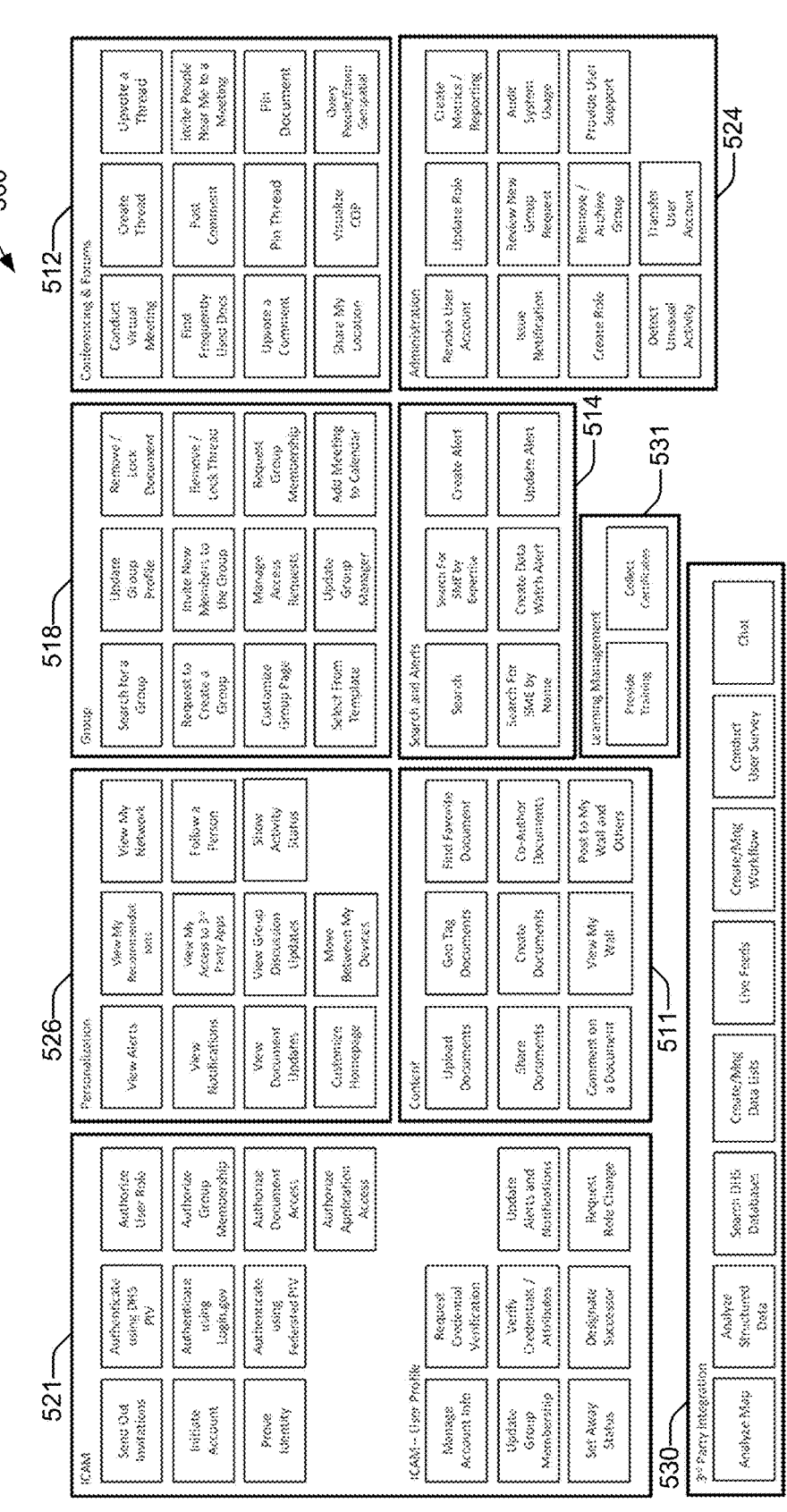
FIG. 5 illustrates a data architecture for use by a system to provide access to services according to an embodiment.

FIG. 5 illustrates a data architecture 500 for use by a system to provide access to services according to an embodiment. Use cases for the portal platform are illustrated, showing business functions that the different categories of components of the portal platform can provide. The data architecture 500 includes ICAM component 521, personalization component 526, group component 518, conferencing and forums component 512, content component 511, learning management component 531, administration component 524, and third-party integration component 530. Some components and services illustrated in FIG. 5 are similar to those components and services that are already described above with reference to FIGS. 1-4.

Figure 6:
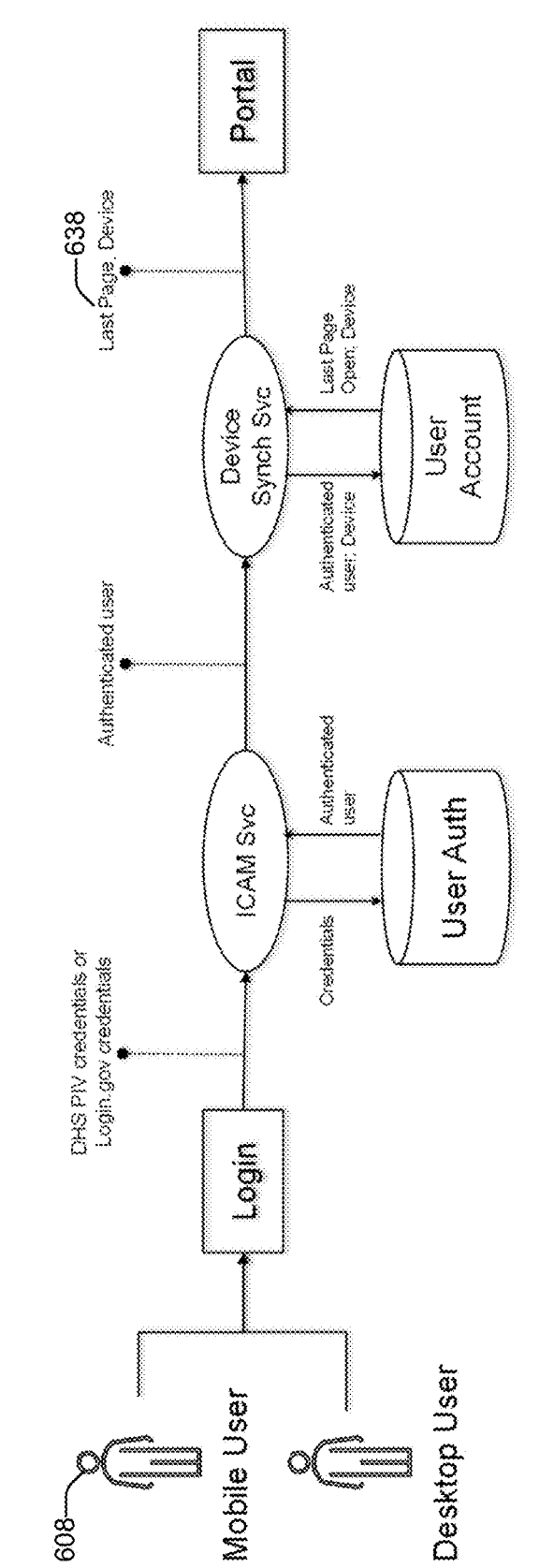
FIG. 6 illustrates a login data flow for use by a system to provide access to services according to an embodiment.

FIG. 6 illustrates a login data flow 600 for use by a system to provide access to services according to an embodiment. The ICAM service component allows for four use cases: a new internal user who needs to register, a new external user who needs to register, an existing internal user who needs to log in, and an existing external user who needs to log in.

The user arrives at the login (e.g., via a landing page) and provides PIV credentials or login.gov credentials (or other credentials appropriate for a given type of authentication procedure used by the portal platform). The ICAM services uses the credentials to perform user authentication, and if successfully authenticated, flow proceeds to device synchronization services. The device synchronization services accesses the user account for the authenticated user and the device of that user, and retrieves information corresponding to the last page open (of the platform portal), and last device state for that user's device. The device synch service then communicates with the user's device to restore the last page/last device state 638 to the user, and passes the user to the portal component for interacting with the platform and the various components/services of the platform.

In an embodiment, a new internal user who needs to register arrives at the portal landing page and selects an option to register as a user with a PIV/CAC. The portal uses an HTTP redirect, to redirect the user to an authentication component, e.g., as provided by Okta, where the user selects the option to authenticate via PIV/CAC. The authentication external JIT account provisioning automatically redirects the user to a registration workflow, e.g., an ACM registration workflow as provided by SailPoint. The user completes a registration form, is assigned entitlements/groups, and the approval workflow approves user registration based on registration content. After registration, the registration workflow writes back to the authentication component and verifies successful provisioning. The registration workflow sets a registration flag on the user ID and writes profile details (roles/attributes). The registration workflow uses a multivalued LDAP attribute to store attribute set values, and assigns a birthright role (if any). The user is directed back to the authentication component, which adds the user to the universal directory, and sends the attributes/roles to the portal. The user is then directed to the portal with a SAML payload with attributes/groups, and the portal can apply a policy enforcement using attribute/role mapping to content tags/metadata/classification.

In an embodiment, a new external user who needs to register follows a similar procedure as set forth above for the new internal user who needs to register, with the difference being that the new external user arrives at the portal landing page and selects an option to register as a user without a PIV/CAC, e.g., the user falls into the category of "all other users." The portal then uses an HTTP redirect, to redirect the user to an authentication component where the user authenticates via, e.g., Login.gov (instead of via PIV/CAC). Remaining steps of the registration process proceed as set forth above.

In an embodiment, an existing internal user who needs to log in arrives at the portal landing page and selects an option to sign in using a PIV/CAC. The portal uses an HTTP redirect, to redirect the user to an authentication component, e.g., as provided by Okta, where the user authenticates via PIV/CAC. The authentication component checks for an ACM registration flag, e.g., the registration flag set by the registration workflow as set forth above when registering a user. If the ACM registration flag is not found, the authentication component directs the user to the registration workflow (to register the user, as set forth above regarding new user registration). If the ACM registration flag is found, the authentication component directs the user to the portal content, which links to a dashboard/user profile component, such as a SailPoint ACM User Profile component. The user profile component performs tasks of attribute update, access request, approve access and certifications. The user profile component directs the user back to the authentication component, which correlates and updates an existing identity for the user as needed (e.g., in SailPoint and Okta, or other external components).

In an embodiment, an existing external user who needs to log in, arrives at the portal landing page and selects an option to sign in using a Login.gov (in contrast to using the PIV/CAC as with the existing internal user example set forth above). The portal uses an HTTP redirect, to redirect the user to an authentication component, e.g., as provided by Okta, where the user authenticates via Login.gov. The authentication component checks for an ACM registration flag, and completes the process as set forth above regarding the existing internal user that similarly checks for the registration flag and performs additional steps culminating in correlating and updating the existing identity.

The last page open/last page/last device 638 is a service the platform provides, whereby the platform remembers where the user left off, so the user can continue where they left off the last time that the user interacted with the platform. For example, the platform records data corresponding to the session state of the platform and user, and stores the data in the user account data store associated with the user's account profile. Some components and services illustrated in FIG. 6 are similar to those components and services that are already described above with reference to FIGS. 1-5.

Figure 7:
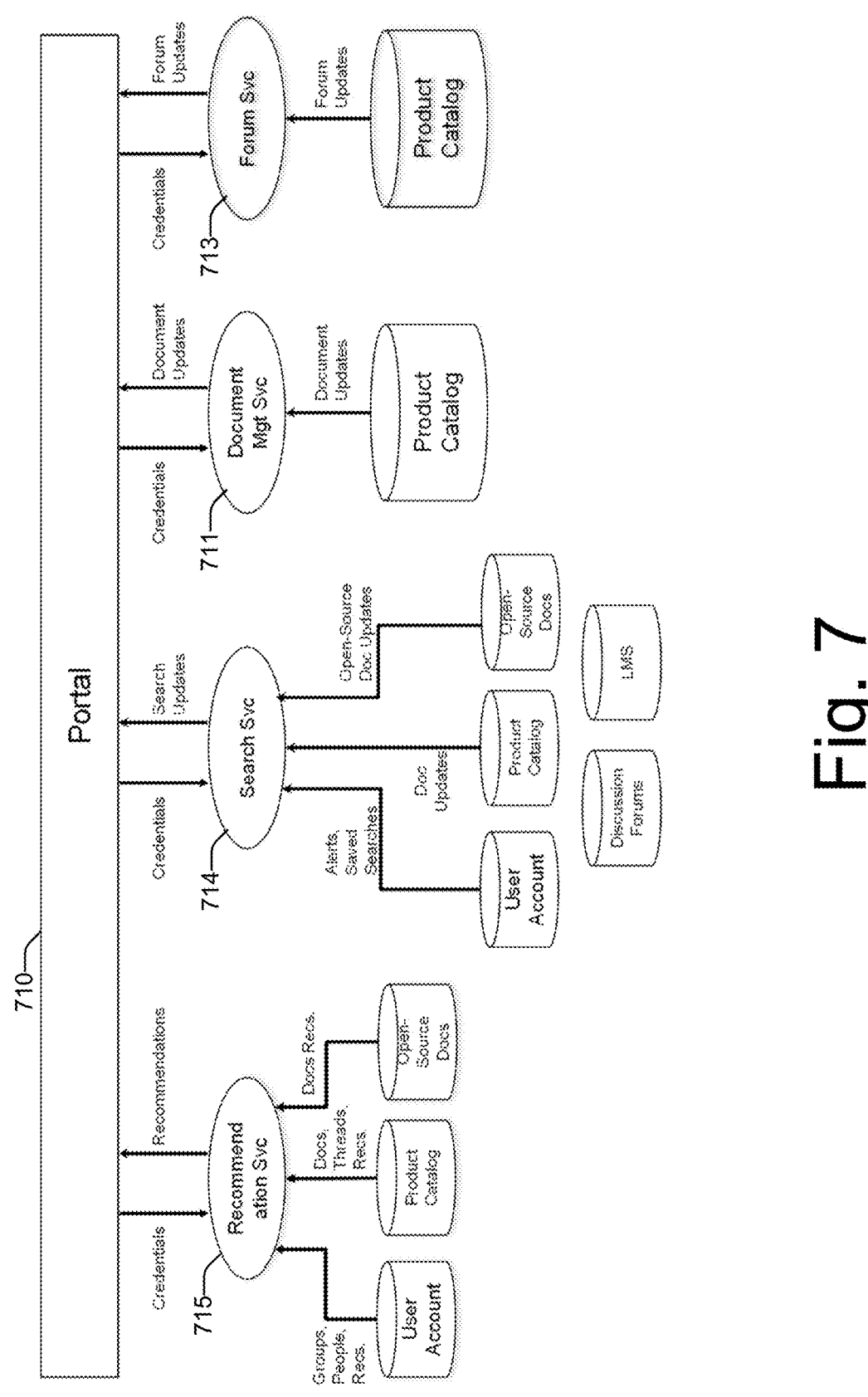
FIG. 7 illustrates a portal data flow for use by a system to provide access to services according to an embodiment.

FIG. 7 illustrates a portal data flow 700 for use by a system to provide access to services according to an embodiment. Some components and services illustrated in FIG. 7 are similar to those components and services that are already described above with reference to FIGS. 1-6. The portal component 710 interacts with recommendation service 715, search service 714, document management service 711, and forum service 713, using credentials (e.g., user attributes, user profile, etc.) to receive recommendations, search updates, document updates, and forum updates, respectively, from the services. The recommendation service 715 can interact with data stores such as user accounts, product catalog, and open source documents, for groups/people/recommendations, documents/threads/recommendations, and documents/recommendations, respectively. The search service 714 can interact with data sources such as user accounts, product catalog, open source documents, discussion forums, and learning management system (LMS). The document management service 711 can interact with product catalog for document updates. The forum service 713 can interact with product catalog for forum updates.

FIG. 8 illustrates a flowchart 800 to provide access to services according to an embodiment. At 810, a computer system executing the information sharing platform receives a user at a landing page of the information sharing platform for selectively accessing services through the information sharing platform. At 820, the information sharing platform uses an application programming interface (API) to access an Identity, Credential, and Access Management (ICAM) component, to authenticate the user based on user credentials of the user. At 830, the information sharing platform retrieves, responsive to authenticating the user, profile attributes stored at the information sharing platform for the user. At 840, the information sharing platform customizes content presented to the user, based on the profile attributes of the user. At 850, the information sharing platform retrieves, from the ICAM component, Attribute-Based Access Control (ABAC) credentials corresponding to the ICAM component authenticating the user. At 860, the information sharing platform enables the user to access a first component that provides component services, based on the information sharing platform checking that the ABAC credentials of the user are compatible with the user having access to the first component. At 870, the information sharing platform prevents the user from accessing a first other component available through the information sharing platform, based on the information sharing platform checking that the ABAC credentials of the user are not compatible with the user having access to the first other component. At 880, the information sharing platform presents, for user interaction, content which the information sharing platform fetches and retrieves from a second component via another API, based on the information sharing platform checking that the ABAC credentials of the user are compatible with the user having access to the content from the second component. At 890, the information sharing platform prevents the display of content from a second other component, based on the information sharing platform checking that the ABAC credentials of the user are not compatible with the user having access to the content from the second other component. At 895, the information sharing platform security trims the component services from the first component, and the content from the second component, based on the ABAC credentials of the user.

Figure 9:
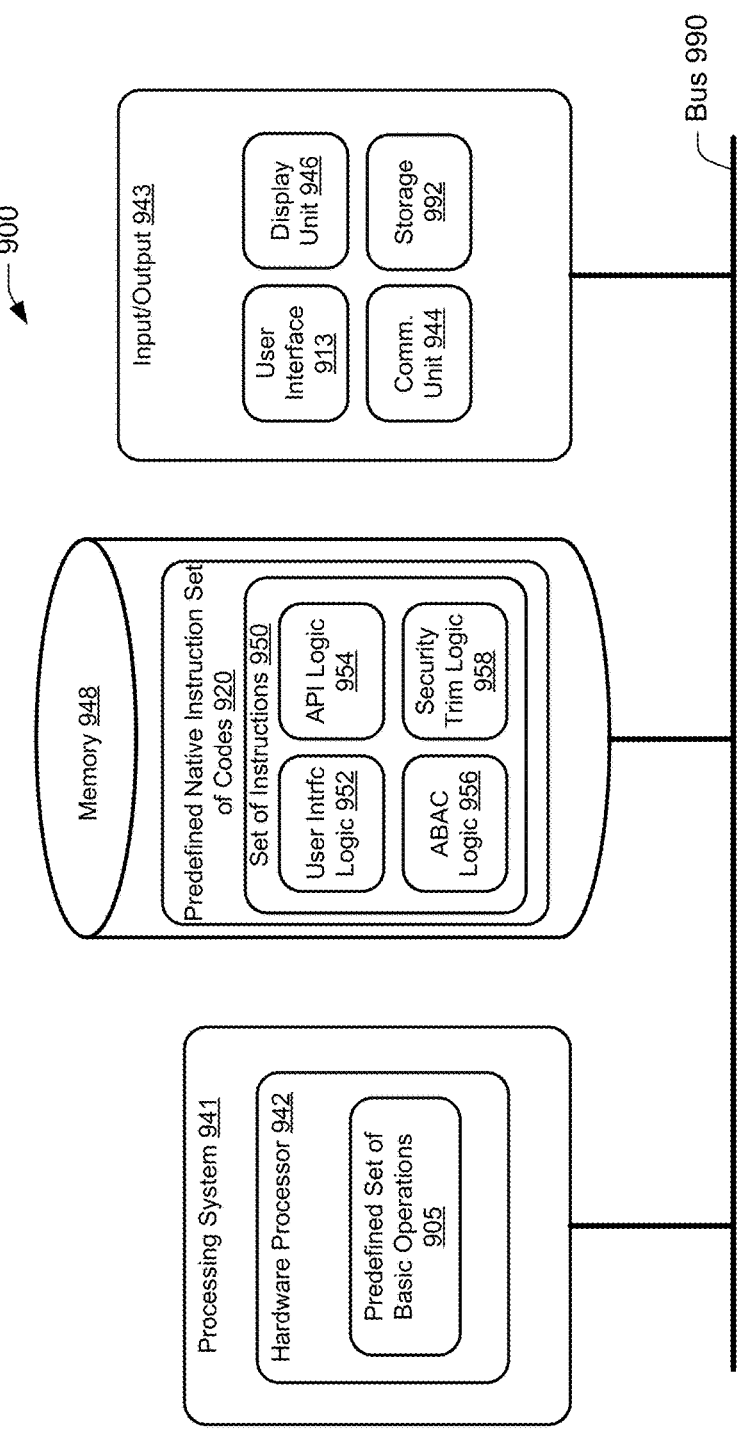
FIG. 9 illustrates a diagram of a computer system according to an embodiment.

FIG. 9 illustrates a diagram of a computer system 900 according to an embodiment. The computer system 900 includes a processing system 941, memory 948, and input/output module 943 communicatively coupled via bus 990. The processing system 941 includes hardware processor 942. The hardware processor 942 includes predefined set of basic operations 905. The memory 948 includes predefined native instruction set of codes 920. The predefined native instruction set of codes 920 includes a set of instructions 950. The set of instructions 950 includes user interface logic 952, API logic 954, ABAC logic 956, and security trimming logic 958. The input/output 943 includes user interface 913, display unit 946, communication unit 944, and storage 992. In an embodiment, such components may serve as the computer system including the logic that carries out the methods described herein.

Certain attributes, functions, steps of methods, or substeps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific termi- nology historically recognized to invoke the benefit of interpretation, such as "means," and the structure corre- sponding to a recited function, to include the equivalents thereof, as permitted to the fullest extent of the law and this written description, may include the disclosure, the accom- panying claims, and the drawings, as they would be under- stood by one of skill in the art.

To the extent the subject matter has been described in language specific to structural features and/or methodologi- cal steps, it is to be understood that the subject matter defined in the appended claims is not necessarily limited to the specific features or steps described. Rather, the specific features and steps are disclosed as example forms of imple- menting the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined or rearranged with other portions of this disclosure and the knowledge of one of ordinary skill in the art. It is the intention of this disclosure to encompass and include such variation. To the extent any elements or steps are described as "optional," it does not indicate that all or any other elements or steps are mandatory.

What is claimed is:

1. A method to provide access to services, comprising:

receiving, by an information sharing platform, a user at a landing page of the information sharing platform for selectively accessing services through the information sharing platform;

accessing, by the information sharing platform using an application programming interface (API), an Identity, Credential, and Access Management (ICAM) compo- nent, to authenticate the user based on retrieving user credentials of the user by reading them from a Personal Identity Verification (PIV) card of the user;

retrieving, from the information sharing platform respon- sive to authenticating the user, profile attributes stored at a data layer of the information sharing platform for the user, wherein the data layer stores the profile attributes including a platform session state and a user session state on a user account data store that the information sharing platform uses to remember where the user left off and enable the user to continue where they left off the last time the user interacted with the information sharing platform, and wherein the data layer stores documents associated with a conferencing component;

customizing information sharing platform content pre- sented to the user, based on the profile attributes of the user, the information sharing platform content includ- ing the conferencing component that executes confer- encing that incorporates the documents with the con- ferencing via file sharing;

retrieving, from the ICAM component, Attribute-Based Access Control (ABAC) credentials corresponding to the ICAM component authenticating the user;

enabling the user to access, through the information sharing platform, a first component that provides com- ponent services including the conferencing, based on the information sharing platform checking that the ABAC credentials of the user are compatible with the user having access to the first component that provides the conferencing;

preventing the user from accessing a first other compo- nent including the documents available through storing by the data layer of the information sharing platform, based on the information sharing platform checking that the ABAC credentials of the user are not compat- ible with the user having access to the documents corresponding to the first other component;

presenting, at the information sharing platform for user interaction, content including discussion forums which the information sharing platform fetches and retrieves from a second component via another API, based on the information sharing platform checking that the ABAC credentials of the user are compatible with the user having access to the content including a user's wall of a message board from the second component;

preventing the information sharing platform from display- ing a particular discussion content from a second other component including a discussion forum, based on the information sharing platform checking that the ABAC credentials of the user are not compatible with the user having access to the particular discussion content from the second other component; and security trimming the component services from the first component, and the content from the second compo- nent, based on the ABAC credentials of the user to allow the user to interact with the user's wall of the message board of the discussion forums, but not the particular discussion content or documents associated with the conferencing according to the ABAC creden- tials of the user.

2. The method of claim 1, wherein the information sharing platform provides the user access to component services of internal components and external components via uniform resource locators (URLs) corresponding to referring links to resulting actions or materials, based on the information sharing platform checking that the ABAC credentials of the user are compatible with the user having access to the resulting actions or materials.

3. The method of claim 1, further comprising retrieving, from the user account data store, profile attributes for the user including the platform session state and the user session state including a personalization indication of a last page open for the user, corresponding to a state of the information sharing platform as viewed by the user during a previous visit.

4. The method of claim 1, wherein the first component includes a core service component that provides content management capabilities for traditional documents, multi- media formats, and binary large object (BLOB) formats, the content management capabilities including displaying of content, versioning, locking, check-in, check-out, user-de- finable metadata, searchable metadata, ABAC security trim- ming, notifications, optical character recognition (OCR) capture, intelligent extraction, automated tagging, decon- struction, redaction, notifications, and record management across different types of devices.

5. The method of claim 1, wherein the first component includes a core service component that provides conferenc- ing capabilities as a conferencing component, that utilize ABAC credentials and profile attributes, to provide real-time interaction and collaboration between users having access to the conferencing capabilities across different types of devices, the conferencing capabilities including scheduling and executing web meetings and conferencing, direct Voice over Internet Protocol (VoIP) calling, direct messaging, persistent virtual meeting spaces, and file sharing and whiteboarding during meetings, the conferencing component allowing users to integrate meetings and events with their local calendar.

6. The method of claim 1, wherein the discussion forum provides asynchronous collaboration among users by supporting persistent discussion forums with message threads including documents and user posts, the discussion forums being open or closed, including managed or ad hoc message boards, the discussion forums allowing equal access to persistent discussions independent of a method of user authorization or an accessing device of the user.

7. The method of claim 1, wherein the first component is includes an application service component that is an administration and security logging and log analysis component that manages such services across the information sharing platform, including providing superuser capabilities across components, centralized log aggregation, and security features.

8. The method of claim 1, wherein the first component is includes an application service component that is an alerting and notifying component that reactively alerts and notifies users regarding document changes, a message being posted, an event being organized, and a workflow action being required, and that also proactively notifies users in case of broadcast messages or emergency events.

9. The method of claim 1, wherein the first component includes an application service component that provides workflow and automation, supporting (1) initialization of a user in predetermined discussion forums based upon the profile attributes and ABAC credentials of the user, (2) routing and signoff of document approvals for publishing or posting, or (3) collecting outside information such as news for posting on the information sharing platform.

10. The method of claim 1, wherein the second component includes a shared service component that spans core service components and is a search component that provides flexible and smart searching of data stores, including a search engine that supports full-text searching, fuzzy searches, browser-based search syntaxes, and enrichment features including spellchecking, geotagging, and semantic models; and wherein the search component performs security trimming of search results based on the profile attributes indicating an identity of the user submitting a search query to the search component.

11. The method of claim 1, wherein the second component includes a shared service component that spans core service components and is a recommendation engine component that provides users suggestions for groups, people, documents, discussion threads, and meetings, based on interests of the user according to the profile attributes of the user.

12. The method of claim 1, wherein the second component includes a shared service component that spans core service components and is a reporting component that allows authorized users to run saved reports or ad hoc reports across data stored in components.

13. The method of claim 1, wherein the second component includes a third party resource drop-in component that is a Learning Management System (LMS) component that manages skills, courseware, curriculum, and training completed databases for user profiles.

14. The method of claim 1, wherein the second component includes a third party resource drop-in component that is a Common Operation Picture (COP) component that provides real-time situational awareness of critical events by fusing real-time data feeds of news, live video, and geo-tracking of critical resources into a single operational picture.

15. The method of claim 1, wherein the second component includes a third party resource drop-in component that is an analytic tools component including a collection of internal utilities and external utilities including a national 411 directory, a geocoding utility, a data base of technical experts, and a reverse phone number lookup.

16. The method of claim 1, wherein the second component includes a third party resource drop-in component that is a Geospatial component that provides map capabilities including viewing roads, topographical maps, satellite viewpoints, routing, points of interest, KML file import and export, editing and map markup and flexible sharing of marked up maps among users or groups of users.

17. The method of claim 1, wherein the second component includes a third party resource drop-in component that is a search external data component including safe internet searches and searches of Federal and State databases that are not Internet-accessible.

18. The method of claim 1, wherein the second component includes a third party resource drop-in component that is a live feeds component including functionality of incorporating live video feeds, automated transcription, and smart tagging including geotagging into a group or conference of the information sharing platform, supporting user devices.

19. A system to provide access to services, comprising:

a computer system, including:

a processing system having a hardware processor configured to perform a predefined set of basic operations by loading corresponding ones of a predefined native instruction set of codes, the predefined native instruction set of codes constituting a set of instructions selectable for execution by the hardware processor;

a memory accessible to the processing system; and a user interface controller under control of the processing system;

user interface logic, stored in the memory, comprising a sequence of instructions selected from the predefined native instruction set of codes of the hardware processor, adapted to:

operate with the processing system and the user interface controller to implement a user interface adapted to prompt for user input and receive the user input;

receive a user at a landing page of an information sharing platform for selectively accessing services through the information sharing platform;

a communication system, under control of the processing system, adapted to communicate with components that provide component services;

session logic, stored in the memory, comprising a respective sequence of instructions selected from the predefined native instruction set of codes of the hardware processor, adapted to retrieve, from a data layer of the information sharing platform, profile attributes including a platform session state and a user session state on a user account data store that the information sharing platform uses to remember where the user left off and enable the user to continue where they left off the last time the user interacted with the information sharing platform, and wherein the data layer stores documents associated with a conferencing component;

customization logic, stored in the memory, comprising a respective sequence of instructions selected from the predefined native instruction set of codes of the hardware processor, adapted to customize information sharing platform content presented to the user, based on the profile attributes of the user, the information sharing platform content including the conferencing component that executes conferencing that incorporates the documents with the conferencing via file sharing;

application programming interface (API) logic, stored in the memory, comprising a respective sequence of instructions selected from the predefined native instruction set of codes of the hardware processor, adapted to use an API to access an Identity, Credential, and Access Management (ICAM) component, to authenticate the user based on retrieving user credentials of the user by reading them from a Personal Identity Verification (PIV) card of the user;

Attribute-Based Access Control (ABAC) logic, stored in the memory, comprising a respective sequence of instructions selected from the predefined native instruction set of codes of the hardware processor, adapted to:

retrieve, from the ICAM component, Attribute-Based Access Control (ABAC) credentials corresponding to the ICAM component authenticating the user;

enable the user to access, through the information sharing platform, a first component that provides component services including the conferencing, based on the information sharing platform checking that the ABAC credentials of the user are compatible with the user having access to the first component that provides the conferencing;

prevent the user from accessing a first other component including the documents available through storing by the data layer of the information sharing platform, based on the information sharing platform checking that the ABAC credentials of the user are not compatible with the user having access to the documents corresponding to the first other component;

present, at the information sharing platform for user interaction, content including discussion forums which the information sharing platform fetches and retrieves from a second component via another API, based on the information sharing platform checking that the ABAC credentials of the user are compatible with the user having access to the content including a user's wall of a message board from the second component; and prevent the information sharing platform from displaying a particular discussion content from a second other component including a discussion forum, based on the information sharing platform checking that the ABAC credentials of the user are not compatible with the user having access to the particular discussion content from the second other component; and security trimming logic, stored in the memory, comprising a respective sequence of instructions selected from the predefined native instruction set of codes of the hardware processor, adapted to perform security trimming on the component services from the first component, and the content from the second component, based on the ABAC credentials of the user to allow the user to interact with the user's wall of the message board of the discussion forums, but not the particular discussion content or documents associated with the conferencing according to the ABAC credentials of the user.

20. A tangible non-transitory computer-readable medium having stored thereon computer-executable instructions that, if executed by a computing device, cause the computing device to:

receive, by an information sharing platform, a user at a landing page of the information sharing platform for selectively accessing component services through the information sharing platform;

access, by the information sharing platform using an application programming interface (API), an Identity, Credential, and Access Management (ICAM) component, to authenticate the user based on retrieving user credentials of the user by reading them from a Personal Identity Verification (PIV) card of the user;

retrieve, from the information sharing platform responsive to authenticating the user, profile attributes stored at a data layer of the information sharing platform for the user, wherein the data layer stores the profile attributes including a platform session state and a user session state on a user account data store that the information sharing platform uses to remember where the user left off and enable the user to continue where they left off the last time the user interacted with the information sharing platform, and wherein the data layer stores documents associated with a conferencing component;

customize information sharing platform content presented to the user, based on the profile attributes of the user, the information sharing platform content including the conferencing component that executes conferencing that incorporates the documents with the conferencing via file sharing;

retrieve, from the ICAM component, Attribute-Based Access Control (ABAC) credentials corresponding to the ICAM component authenticating the user;

enable the user to access, through the information sharing platform, a first component that provides component services including the conferencing, based on the information sharing platform checking that the ABAC credentials of the user are compatible with the user having access to the first component that provides the conferencing;

prevent the user from accessing a first other component including the documents available through storing by the data layer of the information sharing platform, based on the information sharing platform checking that the ABAC credentials of the user are not compatible with the user having access to the documents corresponding to the first other component;

present, at the information sharing platform for user interaction, component content including discussion forums which the information sharing platform fetches and retrieves from a second component via another API, based on the information sharing platform checking that the ABAC credentials of the user are compatible with the user having access to the component content including a user's wall of a message board from the second component;

prevent the information sharing platform from displaying a particular discussion content from a second other component including a discussion forum, based on the information sharing platform checking that the ABAC credentials of the user are not compatible with the user having access to the content from the second other component; and security trim the component services from the first component, and the content from the second component, based on the ABAC credentials of the user to allow the user to interact with the user's wall of the message board of the discussion forums, but not the particular discussion content or documents associated with the conferencing according to the ABAC credentials of the user.

\* \* \* \* \*